(12) United States Patent
Caserta (10) Patent No.: US 10,136,283 B2
(45) Date of Patent: Nov. 20, 2018

(54) METHODS FOR PROVIDING A RESPONSE TO A COMMAND REQUESTING THE EXECUTION OF A PROACTIVE COMMAND

(71) Applicant: STMicroelectronics S.r.l., Agrate Brianza (IT)

(72) Inventor: Francesco Caserta, Naples (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 15/540,230

(22) PCT Filed: Nov. 9, 2015

(86) PCT No.: PCT/IB2015/058635
§ 371 (c)(1),
(2) Date: Jun. 27, 2017

(87) PCT Pub. No.: WO2016/108096
PCT Pub. Date: Jul. 7, 2016

(65) Prior Publication Data
US 2018/0007492 A1    Jan. 4, 2018

(30) Foreign Application Priority Data

Dec. 30, 2014 (IT) .............................. TO2014A1117

(51) Int. Cl.
*H04B 1/38* (2015.01)
*H04W 4/60* (2018.01)
(Continued)

(52) U.S. Cl.
CPC ............ *H04W 4/60* (2018.02); *G06F 3/0659* (2013.01); *H04W 4/14* (2013.01); *H04W 12/02* (2013.01)

(58) Field of Classification Search
CPC ......... H04W 4/60; H04W 4/003; H04W 4/14; G06F 3/0659
(Continued)

(56) References Cited

U.S. PATENT DOCUMENTS 9,917,609 B2 *    3/2018   Smith ..................... H04W 8/18
2005/0188219 A1 *  8/2005   Annic ..................... H04L 41/00
                                                        726/22
(Continued)

FOREIGN PATENT DOCUMENTS

EP      1919157 A1    5/2008
EP      3013085 A1    4/2016

OTHER PUBLICATIONS

GlobalPlatform, Inc., Card Specification, Version 2.2.1 Public Release, Jan. 2011, 303 pages.
(Continued)

*Primary Examiner* — Golam Sorowar
*Assistant Examiner* — Max Mathew
(74) *Attorney, Agent, or Firm* — Slater Matsil, LLP (57) ABSTRACT

A communication method includes receiving a first message of a Short Message Service containing a first command that requests execution of a proactive command. The first message is decrypted according to protocol SCP80 to extract the first command. The execution of the proactive command is requested in order to obtain a response to the proactive command. A second message of the Short Message Service is transmitted to the remote server and indicates that the response to the proactive command has been obtained. A third message of the Short Message Service is received and contains a second command from the remote server. The third message is decrypted according to the protocol SCP80. A response message is generated as a function of the response and encrypted according to the protocol SCP80 to
(Continued)

generate a fourth message of the Short Message Service transmitted to the remote server.

24 Claims, 3 Drawing Sheets

(51) Int. Cl.
    *H04W 4/14*     (2009.01)
    *H04W 12/02*     (2009.01)
    *G06F 3/06*     (2006.01)

(58) Field of Classification Search
    USPC .................................................. 455/466, 90.1
    See application file for complete search history.

(56) References Cited

U.S. PATENT DOCUMENTS

| | | | |
|---|---|---|---|
| 2009/0119364 A1* | 5/2009 | Guillon | H04L 63/168 709/203 |
| 2009/0240944 A1* | 9/2009 | Cho | H04L 63/068 713/175 |
| 2011/0296182 A1* | 12/2011 | Jia | G06Q 20/32 713/168 |
| 2012/0311563 A1* | 12/2012 | Lee | G06F 8/61 717/178 |
| 2013/0067552 A1* | 3/2013 | Hawkes | H04L 63/166 726/7 |
| 2013/0095795 A1* | 4/2013 | Shi | H04L 61/20 455/411 |
| 2013/0227646 A1* | 8/2013 | Haggerty | H04L 63/0853 726/3 |
| 2014/0052992 A1* | 2/2014 | Nozulak | H04L 63/0428 713/171 |
| 2014/0201815 A1* | 7/2014 | Van Nieuwenhuyze | G06F 21/6209 726/4 |
| 2016/0157092 A1* | 6/2016 | Uy | H04W 4/14 455/419 |
| 2017/0033823 A1* | 2/2017 | Smith | H04W 8/18 |
| 2017/0180366 A1* | 6/2017 | Chastain | H04L 63/08 |

OTHER PUBLICATIONS

ETSI TS 102 225 V9.0.0, Technical Specification, "Smart Cards; Secured packet structure for UICC based application (Release 9)" Apr. 2010, 22 pages.
ETSI TS 102 226 V9.2.0, Technical Specification, "Smart Cards; Remote APDU structure for UICC based application (Release 9)" Apr. 2010, 43 pages.

* cited by examiner

METHODS FOR PROVIDING A RESPONSE TO A COMMAND REQUESTING THE EXECUTION OF A PROACTIVE COMMAND

CROSS-REFERENCE TO RELATED APPLICATIONS

This patent application is a national phase filing under section 371 of PCT/IB2015/058635, filed Nov. 9, 2015, which claims the priority of Italian Patent Application No. TO2014A001117, filed on Dec. 30, 2014, each of which applications are hereby incorporated herein by reference.

TECHNICAL FIELD

Embodiments of the present disclosure relate to methods for providing a response to a command requesting the execution of a proactive command.

BACKGROUND

Figure 1:
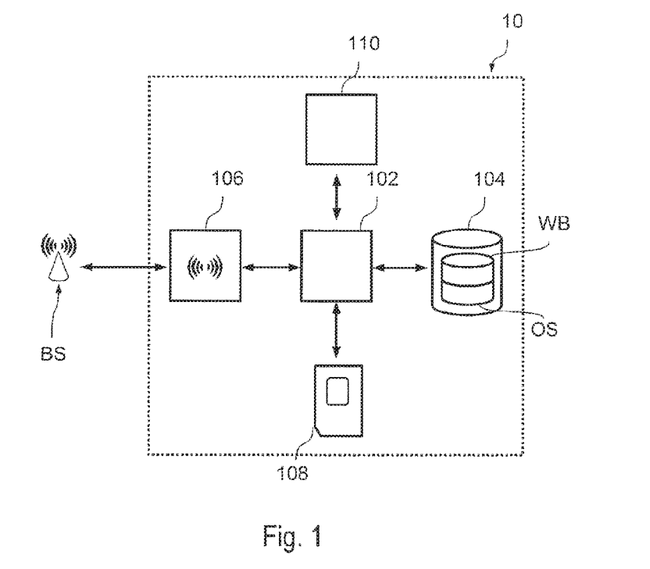

FIG. 1 shows a possible architecture of a mobile device 10, such as a smartphone or a tablet.

Generally, the mobile device 10 comprises one or more processors 102 connected to one or more memories 104. The mobile device 10 comprises moreover at least on mobile communication interface 106 for communication with a base station BS, and a user interface 110, such as a touchscreen. For example, the mobile communication interface 106 may comprise a GSM (Global System for Mobile Communications), CDMA (Code Division Multiple Access) transceiver, W-CDMA (Wideband Code Division Multiple Access), UMTS (Universal Mobile Telecommunications System), HSPA (High-Speed Packet Access) or LTE (Long Term Evolution) transceiver.

For example, in the memory 104 may be stored an operating system OS being executed by the processor 102 and which manages the general functions of the mobile device 10, such as the management of the user interface 110 and the establishment of a connection to the base station BS via the interface 106. The memory 104 may also contain applications being executed by the operating system OS. For example the memory 104 may comprise a web browser application WB.

For establishing a connection with the base station BS, the mobile device 10 is coupled to a processing unit 108 configured to manage the identity identification of the user. For example, usually the mobile device comprises a card holder for receiving a card comprising a Subscriber Identity Module (SIM), which is usually called SIM card. Generally a corresponding module may also be installed directly within the mobile device 10.

For example, nowadays is often used a Universal Integrated Circuit Card (UICC) 108, which is a smart card often used in GSM and UMTS networks. The UICC ensures the integrity and security of all kinds of personal data and typically holds a few hundred kilobytes.

For example, in a GSM network, the UICC 108 contains a SIM application and in a UMTS network a USIM application. A UICC may contain several applications, making it possible for the same smart card to give access to both GSM and UMTS networks, and may also provide storage of a phone book and other applications.

Thus, generally, also the UICC 108 comprises at least one processing unit and at least one memory and permits the execution of applications directly within the UICC.

As mentioned in the foregoing, the UICC may be integrated directly in the mobile device and is in this case often called embedded UICC (eUICC).

Generally, also other applications may be stored on the UICC, which may also communicate with remote hosts.

Figure 2:
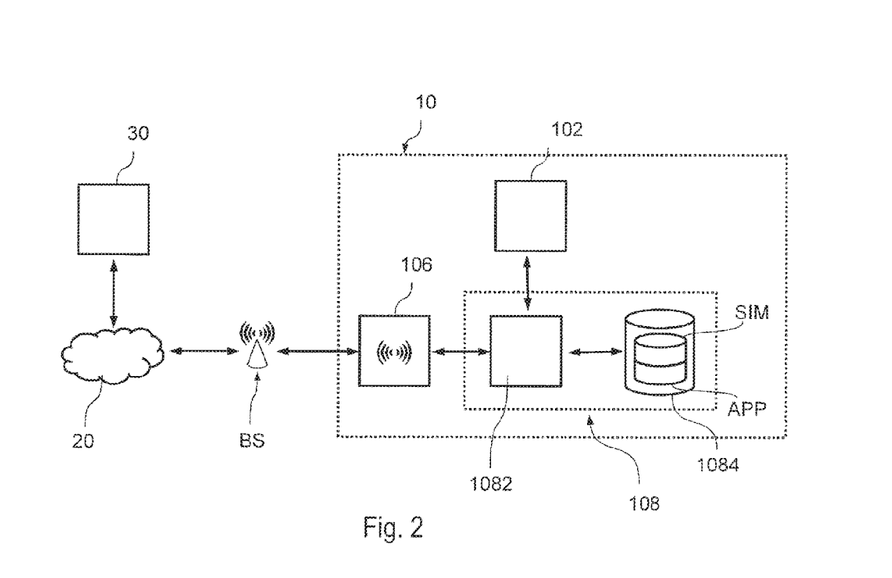

Specifically, as shown in FIG. 2, the processing module 108 often comprises one or more processors 1082 and one or more memories 1084 for executing applications stored in the memory 1084 of the module 108.

For example, the UICC 108 may comprise in addition to the Subscriber Identity Module application (reference sign SIM in FIG. 2) at least one further application APP. For example, this application APP may be configured to communicate (directly or indirectly via the processor 102 and possibly the operating system OS) with the communication interface 106 in order to send data to and receive data from the remote host 30.

For this purpose, the host 30 may be connected via a network 20, such as a Local Area Network (LAN) or a Wide Area Network (WAN), such as the internet, to the base station BS. Accordingly, connection between the host 30 and the UICC 108 may be established by means of the network 20, the base station BS and the communication interface 106.

Generally, the communication may be initiated by the host 30 or the UICC 108.

For example, the application APP may be a web server application, which receives requests from the web browser WB of the mobile device 10 and obtains respective content from a remote host 30, such as a web server.

The application APP may also be an authentication application. In this case, the host 30 may send an authentication request to the UICC 108 and the UICC 108 may send an authentication response to the host 30.

Figure 3:
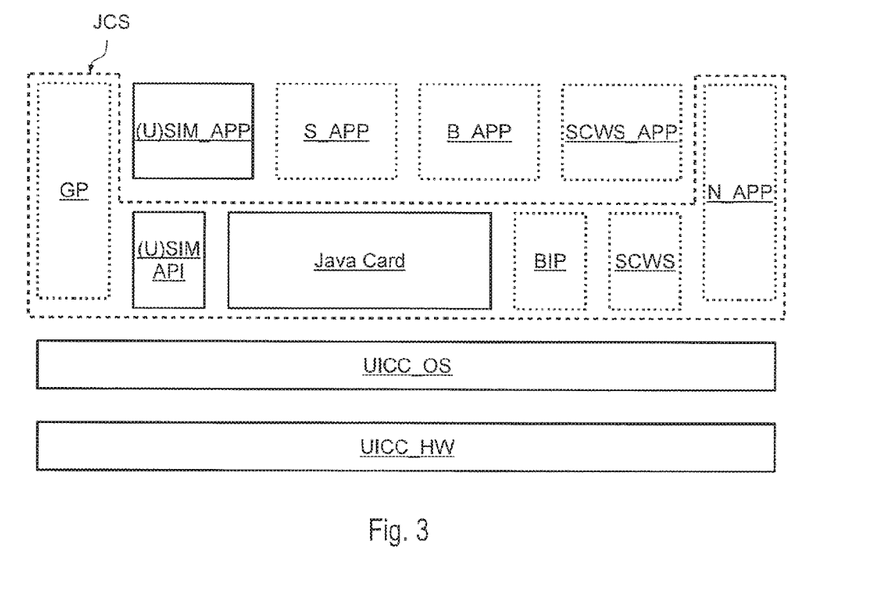

FIG. 3 shows in this respect a typical architecture of the software layers of a UICC card.

Substantially, the UICC 108 comprises a hardware layer UICC_HW being represented (at least) by the processor 1082 and the memory 1084. On top of the hardware layer UICC_HW runs the operating system UICC_OS of the UICC card.

The operating system UICC_OS may manage a plurality of applications.

Specifically, in the example considered, a Java Card System JCS is executed by the operating system UICC_OS, which manages and runs applets, i.e., applications using the APIs (Application Programming Interface) provided by the Java Card System JCS.

For example, the Java Card System JCS comprises usually a SIM and/or USIM API (identified with the reference sign (U)SIM API) which manages the basic Subscriber Identity Module commands and provides functions to higher level SIM or USIM applets (identified with the reference sign (U)SIM_APP).

Generally, the communication with the remote host 30 may be performed via SMS (Short Message Service) or by means of a Bearer Independent Protocol (BIP), such as GPRS, EDGE, or UMTS. Accordingly, often the Java Card System JCS comprises a Bearer Independent Protocol API BIP.

The Java Card™ Platform provides a JAVA™ runtime environment, which is particularly optimized for smart cards. This technology is well known to those skilled in the art, rendering a more detailed description herein superfluous.

Often the Java Card System JCS comprises a GlobalPlatform module GP according to the "GlobalPlatform Card specification", e.g. version 2.2.1. Also this standard is well known to those skilled in the art, rendering a more detailed description herein superfluous. Basically, the GP module provides features such as user authentication through secure channels, or the installation and remote management of the applets. For example, one of the possible encryption mechanisms managed by the GP module may be the SCP (Secure Channel Protocol) 80 specified in the technical specification ETSI TS 102.225 "Smart Cards; Secured packet structure for UICC based applications", e.g. version 9.0.0.

The above mentioned API functions may then be used by the applets, such as the SIM or USIM applet (U)SIM_APP, a basic applet B_APP and/or a secure applet S_APP.

The UICC 108 may comprise also further applications, such as a Smart Card Web Server SCWS and possible Web server applets SCWS_APP, which, e.g., perform the above mentioned web server function.

Generally, the UICC 108 may comprise not only custom applets but also native low level applications N_APP being executed directly by the operating system UICC_OS.

Figure 4:
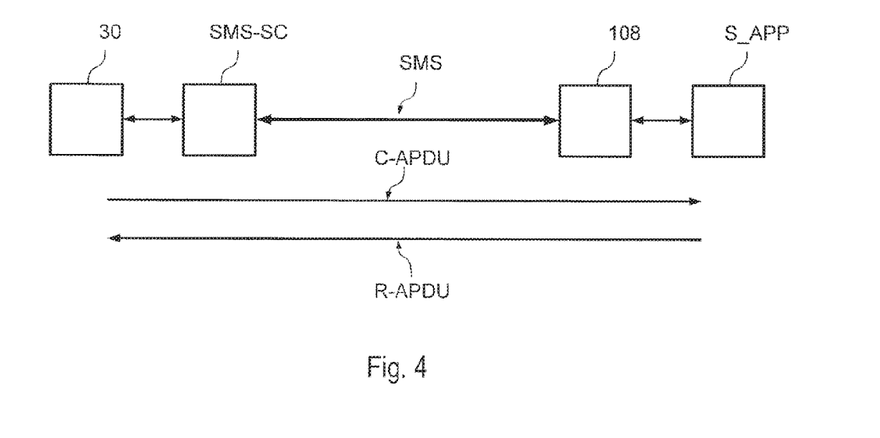

FIG. 4 shows a typical communication by using the remote management protocol SCP 80 as specified in the technical specifications ETSI TS 102.225 "Smart Cards; Secured packet structure for UICC based applications", e.g. version 9.0.0, and in particular in ETSI TS 102.226 "Smart Cards; RemoteAPDUstructure for UICC based applications", e.g. version 9.2.0.

In the example considered, the remote host 30 may send a command, i.e. a Command Application Protocol Data Unit C-APDU, to a secure application S_APP installed on the UICC 108, and receive, from the application S_APP a respective response, i.e. a Response Application Protocol Data Unit R-APDU.

Specifically, in the example considered is used the protocol SCP 80. In this case, the host 30 sends the command C-APDU to a Short Message Service—Service Centre SMS-SC, which encrypts the command C-APDU using SCP80 and encapsulates the encrypted content in a SMS message, which is transmitted to the UICC 108 by means of the base station BS and the mobile device 10. The UICC 108, possibly by using the functions provided by the operating system UICC_OS and the Java Card System JCS, decrypts the content of the SMS message and forwards the content C-APDU to the secure application S_APP.

By means of the SCP80 protocol the host 30 can request a Proof of Receipt (PoR) to the secure application S_APP. Only in this case the secure application S_APP can send the response R-APDU to the host 30 appropriately secured (e.g. by means of the ETSI 102 241 API). Specifically, the secure application S_APP instructs the operating system UICC_OS to encapsulate and encrypt the R-APDU response in the field "additional data" of the PoR message using the SCP80 protocol. The PoR message is in turn encapsulated in an SMS message which is transmitted to the service centre SMS-SC by means of the mobile device 10 and the base station BS. The service centre SMS-SC decrypts the content of the SMS message containing the PoR and forwards the content R-APDU to the host 30.

SUMMARY

Embodiments of the present disclosure relate to techniques for providing a response, i.e., a Response Application Protocol Data Unit R-APDU, to a SCP80 command, i.e., a Command Application Protocol Data Unit C-APDU, requesting the execution of a proactive command. For example, embodiments of the present disclosure may be used to obtain a response to a SCP80 type 4 C-APDU requesting a user input.

The inventor has observed that during a secure remote management application protocol (SCP80) session, as described in the foregoing, a secure application is only allowed to send a secured R-APDU by means of a PoR message, i.e., the ETSI 102 241 API functions to return the R-APDU to the remote host by means of the PoR can be used only when the PoR has been requested by the remote host and has not been sent to the remote host itself yet.

However, this creates problems whenever the target application has to request a proactive command to the mobile device 10 in order to correctly calculate the response R-APDU. For example, as will be described in the following, the remote host may instruct an application installed on the UICC in order to request some user feedback information, such as a PIN, a password or merely a simple confirmation.

Embodiments of the invention related to methods, a related Universal Integrated Circuit Card, mobile device, and server, as well as a corresponding related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is evidently intended to highlight the possibility for the present disclosure to be implemented in a distributed/modular fashion.

The claims are an integral part of the technical teaching of the disclosure provided herein.

As mentioned in the foregoing, the present disclosure provides solutions for providing the response APDU to a SCP80 C-APDU requesting the execution of a proactive command, i.e., a command to be executed by a respective mobile device.

In various embodiments, a server generates a first C-APDU requesting the execution of one or more proactive commands. This command is encrypted according to the protocol SCP80, thereby generating a first SMS message, which is transmitted to a mobile device, such as a mobile phone, e.g., a smartphone.

Accordingly, in various embodiments, a SIM card, such as an Universal Integrated Circuit Card (UICC), e.g., an application installed on such an UICC, may receive from a remote server, e.g., by means of the communication interface of a respective mobile device, the first SMS message containing the first command.

Accordingly, in various embodiments, the first SMS message is decrypted according to the protocol SCP80, thereby extracting the first C-APDU. Therefore, once the first C-APDU has been obtained, one or more proactive commands may be executed in order to obtain the respective response. For example, the UICC may use the proactive UICC service, as described, e.g., in ETSI 102 223, to send a proactive command to the mobile device and obtain the corresponding response from the mobile device itself. In various embodiments, the SIM card may also transmit a Proof of Receipt message to the server, indicating that the first command has been received.

In some embodiments, the card transmits, e.g., by means of the communication interface of the respective mobile device, a second SMS message to the remote server indicating that the response to all the proactive commands has been obtained.

Accordingly, the server receives this second SMS message from the mobile device and may determine that the response to the proactive command had been obtained.

Thus, in various embodiments, (once having received the second SMS) the server generates a second C-APDU requesting the transmission of the R-APDU of the first C-APDU, or more generally requesting a R-APDU that contains data determined as function of the response to the proactive command. The second command is encrypted according to the protocol SCP80 and transmitted by means of a third SMS message to the mobile device.

Accordingly, in various embodiments, the SIM card receives this third SMS message and decrypts it according to the protocol SCP80 in order to extract the second command.

In several embodiments, the SIM card generates a response message as a function of the response to the proactive command and encrypts the response message according to the protocol SCP80.

Accordingly, once the SIM card has received the second command, the response message may be transmitted by means of a fourth SMS message to the remote server. Specifically, in various embodiments, the SIM card may include the response message in a Proof of Receipt message indicating that the second command had been received.

Consequently, the server receives the fourth SMS message and may decrypt the SMS message according to the protocol SCP80 in order to extract the response message.

For example, the solutions described herein, may be used in Universal Integrated Circuit Cards being based on the Java Card™ System described in the foregoing.

For example, the present disclosure may be used to implement the "SIGN TRANSACTION" command or the "MANAGE PC" command of the Mobile Connect protocol. However, generally, the first command may also request any other user input, such as an approval or the input of some data, e.g. a PIN code or a password, the position of the mobile device, the transmission of an electronic message, the execution of a mobile call, etc.

BRIEF DESCRIPTION OF THE DRAWINGS

Embodiments of the present disclosure will now be described with reference to the annexed drawings, which are provided purely by way of non-limiting example and in which:

FIGS. 1 to 4 have already been described in the foregoing; and

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In the following FIGS. 5 to 6 parts, elements or components which have already been described with reference to FIGS. 1 to 4 are denoted by the same references previously used in such Figures; the description of such previously described elements will not be repeated in the following in order not to overburden the present detailed description.

As mentioned in the foregoing, during a secure remote management application protocol (SCP80) session, a secure application is only allowed to send a secured R-APDU by means of a PoR message, i.e. the ETSI 102 241 API functions to return the R-APDU to the remote host by means of the PoR, can be used only when the PoR has been requested by the remote host and has not been sent to the remote host itself yet.

However, a problem occurs whenever the secure application has to request a proactive command to the mobile device in order to correctly calculate the response R-APDU.

For example, as will be described in the following, the remote host may instruct an application installed on the UICC in order to request some user feedback information, such as a PIN, a password or merely a simple confirmation. In this situation the UICC automatically requests to the mobile device the sending of an empty PoR to the remote server, i.e. the PoR is sent empty and cannot be used to send the R-APDU.

Figure 5:
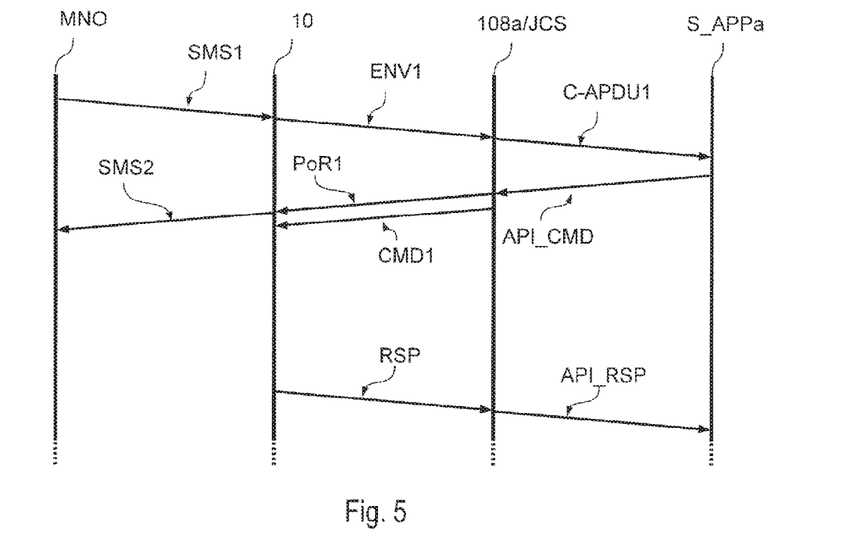
FIGS. 5 and 6 show an embodiment to provide the R-APDU via the SCP80 protocol after a proactive command has been requested.

FIG. 5 illustrates a situation in which this problem occurs.

A Mobile Network Operator (MNO) authentication server MNO sends by means of the SCP80 protocol a command C-APDU1 to an application S_APPa running on the UICC 108a, requesting the respective Proof of Receipt. Specifically the server MNO encapsulates and encrypts the command C-APDU1 in an SCP80 packet and sends this packet to the mobile device 10 by means of the short message SMS1. For example, the command APDU C-APDU1 could be a type 2 or a type 4 C-APDU, i.e. a C-APDU which requires a response APDU R-APDU1 containing some response data.

The mobile device 10 recognizes that the message SMS1 contains a SCP80 packet and sends the latter to the UICC 108a by means of an ENVELOPE APDU ENV1. The UICC 108a, e.g. by using its operating system UICC_OS, identifies the target application S_APPa, e.g. by using the TAR (Toolkit Application Reference) contained in the SCP80 packet, decrypts the SCP80 packet and passes the contained command APDU C-APDU1 to the target application S_APPa.

In order to calculate the respective response R-APDU1 the application S_APPa may need to request one or more proactive commands to the mobile device 10, for example to obtain some user input, such as a simple approval or the input of some data, e.g. a PIN code or a password, to obtain the position of the mobile device 10, transmitting an SMS, performing a mobile call, etc. In this case, the application S_APPa asks the UICC operating system UICC_OS, e.g. by means of the ETSI 102 241 API, to issue a proactive command request CMD1 to the mobile device 10 by means of an API function call API_CMD1.

As stated e.g. in the ETSI 102 241 API, there is no way to transmit the response APDU by means of the additional data field of a PoR message after that a proactive command has been requested. In fact, as soon as the API_CMD1 API request arrives, the UICC 108*a*, by means of its operating system UICC_OS, automatically requests the sending of an empty Proof of Receipt PoR1 to the mobile device 10, which for example encapsulates PoR1 in a short message SMS2 and sends it back to the server MNO. This implies that R-APDU1 cannot be sent to the server MNO by means of the Proof of Receipt of C-APDU1, i.e. PoR1, as in the usual scenario depicted in FIG. 4. Specifically, the server MNO receives an empty Proof of Receipt PoR1 instead of a PoR containing the response APDU R-APDU1. Due to the fact that the PoR1 is empty and thus meaningless, the MNO may also not request the transmission of the first PoR and accordingly the SMS message SMS2 containing the PoR in response to the command C-APDU1 is purely optional.

Generally, one possibility to overcome this problem would be the transmission of the response R-APDU1 by using a different protocol, i.e. not the SCP80 protocol, for example, by sending a normal SMS. However, compared to the SCP protocol, usually these communications are significantly less secure.

Accordingly, in an embodiment, still the SCP80 protocol is used to transmit the response R-APDU1 thereby avoiding also the implementation of other custom protocols in the Java Card System JCS.

Figure 6:
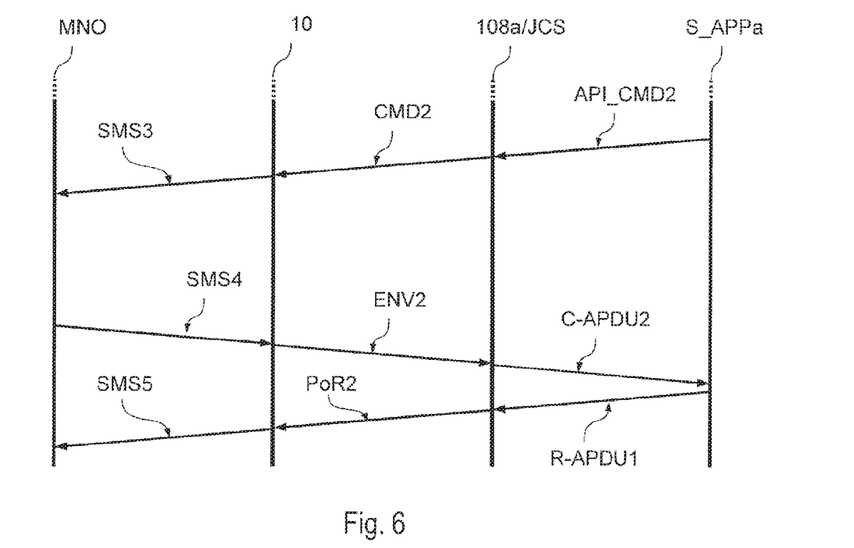

FIG. 6 shows in this respect a possible solution which proceeds at the end of the steps shown in FIG. 5.

After requesting the sending of the Proof of Receipt PoR1 to the mobile device 10, the UICC 108*a* issues the proactive command request CMD1 previously requested by the application S_APPa. The mobile device 10 executes the requested proactive command and sends the respective response data to the UICC 108*a* by means of a terminal response APDU RSP1. The operating system UICC_OS, in turn, responds to the API call API_CMD1 with the data API_RSP1 contained in the terminal response RSP1. In the example considered, the application S_APPa requested the execution of only one proactive command, and can now calculate the response APDU R-APDU1. Generally more than one proactive command can be requested.

As soon as API_RSP1 is returned, the application S_APPa may request the sending of an acknowledgement to the server MNO. This message is used to acknowledge to the server MNO that all the proactive commands have been correctly executed and the response APDU R-APDU1 is ready to be retrieved by another command C-APDU. The acknowledgement may be useful in case one of the requested proactive commands requires an user input.

In this case the application S_APPa requests, e.g. by means of the API call API_CMD2, the sending of a SMS message containing the acknowledgement. Once received the latter API request API_CMD2, the UICC 108*a* issues a respective proactive command request CMD2 to the mobile device 10, which in turn sends the short message SMS3. Generally, this SMS message may also be empty, but preferably contains at least the data needed to associate the acknowledgment to the initial command C-APDU1, e.g. by including the TAR code of the application S_APPa in the short message SMS3.

The server MNO, e.g., after the reception of the acknowledgement SMS3, sends by means of the SCP80 protocol a second command C-APDU2 to the application S_APPa running on the UICC 108*a* that represents a request to obtain the previous APDU response R-APDU1. C-APDU2 can be either a retransmission of C-APDU1 or any APDU agreed by the remote host and the application S_APPa. Specifically the server MNO encapsulates C-APDU2 in a SCP80 packet and transmits the latter to the mobile device 10 by means of a short message SMS4. The mobile device 10, again, recognizes that SMS4 contains a SCP80 packet and transmits it to the UICC 108*a*, which extracts the command APDU C-APDU2 and sends the latter to the application S_APPa. The application S_APPa can now use the PoR of C-APDU2, i.e., PoR2, to send to the server MNO the response APDU of the previous command APDU C-APDU1, i.e. R-APDU1. Specifically, the application S_APPa, e.g. by calling the "post( )" function of the "EnvelopeResponseHandler" class defined in the ETSI 102 241 specification, may submit the response APDU R-APDU1, i.e. the response APDU of C-APDU1, to the operating system UICC_OS of the UICC 108*a*. Then the UICC 108*a*, by means of its operating system UICC_OS, may encapsulate and encrypt the submitted response APDU R-APDU1 in the Proof of Receipt PoR2, i.e. the Proof of Receipt of the command APDU C-APDU2, and may request to the mobile device 10 the sending of the latter to the server MNO. The mobile device 10, in turn, encapsulates the Proof of Receipt PoR2 in the short message SMS5 and sends the latter to the server MNO.

Summarizing in response to the command C-APDU2, the application S_APPa running on the UICC 108*a* responds, by means of the Proof of Receipt PoR2, with the previously calculated R-APDU1. Thus, generally, the content of the Proof of Receipt PoR2 of the second command C-APDU2 is the response APDU R-APDU1 of the first command C-APDU1.

Those of skill in the art will appreciate that the content of the response R-APDU1 may be calculated also only once the command C-APDU2 has been received, or generally between the reception of the response RSP1 and the transmission of the response R-APDU2.

For example, a possible protocol, which might request a proactive command by means of SCP80 is the Mobile Connect protocol, e.g. version 1.9. Specifically, the Mobile Connect protocol, as specified by GSMA (Groupe Speciale Mobile Association), allows consumers to securely access a wide range of digital services by using their mobile phone account for authentication. For example, the user may request access to some kind of service, such as a web page authentication, provided by a server supporting Mobile Connect. Next the user receives from the remote server an authentication request, such as a message requesting an authentication confirmation and/or a PIN, on his mobile phone and access is only granted if the user's input satisfies the authentication request. Accordingly, with the current architecture, the Mobile Connect protocol version 1.9 may not be managed with the SCP80 protocol.

Specifically, the above issue applies at least to the "SIGN TRANSACTION" and "MANAGE PC" commands of the Mobile Connect standard. Particularly the "SIGN TRANSACTION" command is a significant example of this issue and is explained in the following.

Once the user has requested access to a given service provided by a remote host 30, the remote host 30 will send an authentication request to a Mobile Network Operator authentication server MNO, which in turn will send a SIGN TRANSACTION APDU C-APDU1 to the Mobile Connect application S_APPa resident on the user's UICC.

This type 4 command APDU is used to transmit an authentication request to the Mobile Connect application and is composed of the following bytes expressed in hexadecimal (according to the 1.9 version of the specification):

| | |
|---|---|
| 00 A1 P1 P2 Le | (C-APDU header) |
| 01 04 XX XX XX XX | (TLV 1) |
| 02 04 XX XX XX XX | (TLV 2) |
| 8D XX ... XX | (TLV 3) |

The first five bytes represent the well-known C-APDU header. P1 can be used to set how the text message shall be displayed, while P2 is used to identify the authentication handler, which specifies the type of authentication (such as PIN, message confirmation or both) and the authentication key used to calculate a cryptogram, which shall be returned in the corresponding R-APDU and must be verified by the remote host as a further guarantee that the R-APDU was sent by the user's mobile device.

Following the header, three TLV (Tag Length Value) object are provided, representing respectively a numerical identifier of the authentication request, the date of the authentication request and a variable length message to be showed to the user.

For example, a typical "SIGN TRANSACTION" command may have the following command C-APDU1 content:
00 A1 01 01 27
01 04 00 00 00 01
02 04 54 53 66 A4
8D 19 04 45 6E 74 65 72 20 79 6F 75 72 20 70 65 72 73 6F 6E 61 6C 20 63 6F 64 65 which would specify an authentication handler identifier "01", a transaction identifier "00 00 0000 01", the date Oct. 31, 2014 at 10 hr 38 min 28 sec and the text message "Enter your personal code."

Once received this SIGN TRANSACTION APDU C-APDU1, the Mobile Connect application S_APPa should, for example, query a local database containing the authentication handler in order to determine which authentication method should be used for the authentication handler "01". For example, the authentication handler "01" may specify that PIN authentication is required and that the cryptogram shall be calculated using Triple DES. The Mobile Connect application S_APPa, then, should request the PIN, by means of a GET INPUT proactive command, to the user, verify the correctness of the inserted PIN and calculate the cryptogram using the key stored in the authentication handler "01". This cryptogram should then be encapsulated in a response APDU R-APDU1, which should be sent to the remote host using the Proof of Receipt PoR1 of the SIGN TRANSACTION command APDU C-APDU1.

However the situation described before is not practically realizable. In fact, as described in the foregoing, once the "GET INPUT" proactive command is requested by the Mobile Connect application to verify the PIN, The response APDU R-APDU1 cannot be added anymore to the Proof of Receipt PoR1. This implies that the remote host receives an empty PoR instead of the expected secured response APDU R-APDU1 containing the cryptogram, and the authentication ever fails.

However the solution described above can be used to transmit the response APDU R-APDU1 of the SIGN TRANSACTION C-APDU1. Specifically, once the user has inserted the PIN and the UICC operating system has returned the inserted PIN to the Mobile Connect application S_APPa, i.e., API_RSP1 has been received, the latter verifies the correctness of the PIN and calculates the response APDU R-APDU1, including the cryptogram.

For example, for the above "SIGN TRANSACTION" APDU C-APDU1 the response APDU R-APDU1 data field may have the following byte sequence as content:

| | |
|---|---|
| 01 04 00 00 00 01 | (TLV 1) |
| 02 04 54 53 66 A4 | (TLV 2) |
| 10 01 01 | (TLV 3) |
| 11 08 33 D0 B8 F8 FF FE 16 48 | (TLV 4) |

Specifically, the first two TLV correspond to the transaction date and identifier sent in the "SIGN TRANSACTION" C-APDU. The third TLV indicates the user response status, e.g. indicates that the user has accepted authentication. Finally, the fourth sequence contains the MAC cryptogram which is used to authenticate the response.

However, as mentioned in the foregoing, R-APDU1 cannot be sent autonomously to the server MNO.

Accordingly, in an embodiment, the Mobile Connect application requests the sending by the mobile device of an unencrypted SMS message SMS3 to the Mobile Network Operator server containing a predetermined content. This message acts as an acknowledgement that the Mobile Connect application has successfully calculated the R-APDU of the SIGN TRANSACTION C-APDU, i.e., R-APDU1.

Once the server MNO receives and successfully interprets the message SMS3, the server MNO performs a new SCP80 communication with the Mobile Connect application S_APPa. Specifically, this time the server MNO sends a new command C-APDU2 that is meant to request the transmission of the response APDU of the previous SIGN TRANSACTION command, i.e., the response R-APDU1. For example the command C-APDU2 can be either the retransmission of the SIGN TRANSACTION, or a newly defined C-APDU.

Accordingly, once the Mobile Connect application S_APPa receives C-APDU2, it can use the Proof of Receipt PoR2 related to the command C-APDU2 to send the response R-APDU of the SIGN TRANSACTION APDU, i.e. R-APDU1, to the server MNO. The PoR is sent encapsulated in a message SMS5 directed toward the MNO. The latter decrypts the message and obtains R-APDU1, which is passed to the remote host.

As mentioned in the foregoing, a similar problem exists also for the command "MANAGE PC" of the Mobile Connect and more specifically in any other protocol or any other command using the protocol SCP80 in which the target secure application S_APPa needs to request at least one proactive command to the mobile device 10 in order to correctly calculate the response APDU R-APDU1 of a command APDU C-APDU1.

As understood herein, a device is covered by a standard if it meets the requirements of a version of the standard that was in effect at the effective filing date of this patent.

Of course, without prejudice to the principle of the invention, the details of construction and the embodiments may vary widely with respect to what has been described and illustrated herein purely by way of example, without thereby departing from the scope of the present invention, as defined by the ensuing claims.

The invention claimed is:
1. A communication method comprising:
receiving a first message of a Short Message Service containing a first command from a remote server, the first command requesting execution of a proactive command;
decrypting the first message according to a secure channel protocol, thereby extracting the first command;
requesting the execution of the proactive command in order to obtain a response to the proactive command;

transmitting a second message of the Short Message Service to the remote server, the second message indicating that the response to the proactive command has been obtained;

receiving a third message of the Short Message Service, the third message containing a second command from the remote server, the second command requesting transmission of a response message determined as a function of the response to the proactive command;

decrypting the third message according to the secure channel protocol, thereby extracting the second command;

generating a response message as a function of the response to the proactive command;

encrypting the response message according to the secure channel protocol, thereby generating a fourth message of the Short Message Service; and transmitting the fourth message to the remote server.

2. The method according to claim 1, further comprising:
generating a second response message representing a Proof of Receipt of the first command; and
transmitting the second response message to the remote server.

3. The method according to claim 1, wherein the first command is a "SIGN TRANSACTION" command.

4. The method according to claim 1, wherein the first command is a "MANAGE PC" command of a Mobile Connect protocol.

5. The method according to claim 1, wherein the first command comprises a command requesting a user input.

6. The method according to claim 5, wherein the user input comprises an approval, input of data, a position of a mobile device, transmission of an electronic message, or execution of a mobile call.

7. The method according to claim 5, wherein the user input comprises input a PIN code or a password.

8. A communication method comprising:
generating a first command, the first command requesting execution of a proactive command;
encrypting the first command according to a secure channel protocol, thereby generating a first message of a Short Message Service;
transmitting the first message to a mobile device;
receiving a second message of the Short Message Service from the mobile device, the second message indicating that a response to the proactive command has been obtained;
generating a second command, the second command requesting transmission of a response message determined as a function of the response to the proactive command;
encrypting the second command according to the secure channel protocol, thereby generating a third message of the Short Message Service;
transmitting the third message to the mobile device;
receiving a fourth message of the Short Message Service containing a response message from the mobile device, the response message containing data determined as a function of the response to the proactive command; and
decrypting the fourth message according to the secure channel protocol, thereby extracting the response message.

9. The method according to claim 8, wherein the first command is a "SIGN TRANSACTION" command.

10. The method according to claim 8, wherein the first command is a "MANAGE PC" command of a Mobile Connect protocol.

11. The method according to claim 8, wherein the first command comprises a command requesting a user input.

12. The method according to claim 11, wherein the user input comprises an approval, input of data, a position of a mobile device, transmission of an electronic message, or execution of a mobile call.

13. The method according to claim 11, wherein the user input comprises input a PIN code or a password.

14. A server comprising
a processor; and
a non-transitory computer-readable storage medium storing a program to be executed by the processor, the program including instructions for performing the method according to claim 8.

15. A chip card comprising:
a processor; and
a non-transitory computer-readable storage medium storing a program to be executed by the processor, the program including instructions for:
receiving a first message of a Short Message Service containing a first command from a remote server, the first command requesting execution of a proactive command;
decrypting the first message according to a secure channel protocol, thereby extracting the first command;
requesting the execution of the proactive command in order to obtain a response to the proactive command;
transmitting a second message of the Short Message Service to the remote server, the second message indicating that the response to the proactive command has been obtained;
receiving a third message of the Short Message Service, the third message containing a second command from the remote server, the second command requesting transmission of a response message determined as a function of the response to the proactive command;
decrypting the third message according to the secure channel protocol, thereby extracting the second command;
generating a response message as a function of the response to the proactive command;
encrypting the response message according to the secure channel protocol, thereby generating a fourth message of the Short Message Service; and
transmitting the fourth message to the remote server.

16. The chip card according to claim 15, wherein the program includes further instructions for:
generating a second response message representing a Proof of Receipt of the first command; and
transmitting the second response message to the remote server.

17. The chip card according to claim 15, wherein the first command is a "SIGN TRANSACTION" command or a "MANAGE PC" command of a Mobile Connect protocol.

18. The chip card according to claim 15, wherein the first command comprises a command requesting a user input, the user input comprising an input selected from the group consisting of an approval, a data input, a position of a mobile device, transmission of an electronic message, and execution of a mobile call.

19. The chip card according to claim 15, wherein the chip card comprises a Universal Integrated Circuit Card.

20. The chip card according to claim 19, wherein the chip card comprises a memory having stored therein a Java Card™ System and an application.

21. A mobile device comprising:
   the chip card according to claim 15; and
   a communication interface configured to transmit and receive messages of the Short Message Service.

22. The method according to claim 1, wherein the secure channel protocol is protocol SCP80.

23. The method according to claim 8, wherein the secure channel protocol is protocol SCP80.

24. The chip card according to claim 15, wherein the secure channel protocol is protocol SCP80.

* * * * *